United States Patent [19]

Yano

[11] Patent Number: 5,529,475
[45] Date of Patent: Jun. 25, 1996

[54] EXTRUDER FOR RUBBERY MATERIALS

[75] Inventor: Eiji Yano, Musashimurayama, Japan

[73] Assignee: Bridgestone Corporation, Tokyo, Japan

[21] Appl. No.: 280,328

[22] Filed: Jul. 25, 1994

[30] Foreign Application Priority Data

Jul. 30, 1993 [JP] Japan .................. 5-208673

[51] Int. Cl.$^6$ .................................... B29C 47/12
[52] U.S. Cl. ................ 425/183; 264/39; 425/186; 425/192 R
[58] Field of Search ................ 425/183, 184, 425/185, 186, 182, 188, 190, 192 R; 264/39

[56] References Cited

U.S. PATENT DOCUMENTS

| 3,130,468 | 4/1964 | McFall ................... | 425/183 |
| 4,082,487 | 4/1978 | Rapp ...................... | 425/183 |
| 4,379,685 | 4/1983 | Tada et al. .............. | 425/183 |
| 4,449,907 | 5/1984 | Yonezawa et al. ...... | 425/183 |
| 4,555,228 | 11/1985 | Nishiike et al. ........ | 425/185 |
| 4,652,410 | 3/1987 | Inoue et al. ............ | 264/39 |
| 4,895,507 | 1/1990 | Yano ...................... | 425/192 R |
| 5,190,772 | 3/1993 | Conselvan et al. ..... | 425/184 |

FOREIGN PATENT DOCUMENTS

| 0282731 | 9/1988 | European Pat. Off. . | |
| 0316122 | 5/1989 | European Pat. Off. . | |
| 1806301 | 6/1969 | Germany ................ | 425/186 |
| 3629096 | 3/1988 | Germany . | |
| 4304174 | 8/1994 | Germany . | |
| 57-210839 | 12/1982 | Japan . | |
| 60-225726 | 11/1985 | Japan ..................... | 425/183 |
| 4-42175 | 7/1992 | Japan . | |
| 5-111908 | 5/1993 | Japan ..................... | 425/192 R |

OTHER PUBLICATIONS

Patent Abstracts of Japan, vol. 7, No. 68 (M–201) 19 Mar. 1983.
Patent Abstracts of Japan, vol. 15, No. 235 (M–1125) 17 Jun. 1991.

Primary Examiner—Jay H. Woo
Assistant Examiner—Duane S. Smith
Attorney, Agent, or Firm—Sughrue, Mion, Zinn, Macpeak & Seas

[57] ABSTRACT

An extruder for rubbery materials includes an extruding unit having a die holder. A horizontal lead-through groove is formed in the die holder for slidably arranging a die plate therein. A rubbery material is extruded through the die plate in a predetermined direction to form a strip rubber member with a predetermined cross-section. A storing device is arranged on one side of the extruding unit, for temporarily storing a plurality of die plates to be subsequently used on a storing table in accordance with a predetermined use priority. The storing device delivers a next die plate from the storing table to a waiting position along the extension line of the lead-through groove. A moving device is operative when the die plates are to be changed, for moving a current die plate together with the next die plate at the waiting position, along the lead-through groove in a direction toward the other side of the extruding unit. The moving device thereby ejects the current die plate from the lead-through groove and moves the next die plate to an extruding position in the lead-through groove.

4 Claims, 5 Drawing Sheets

FIG. 1

FIG_2

EXTRUDER FOR RUBBERY MATERIALS

BACKGROUND OF THE INVENTION

1. Field of the Invention

The present invention relates to an extruder for rubbery materials, which is capable of exchanging die plates at a high speed.

2. Description of the Related Art

Various types of extruders for extruding rubbery materials are known. For example, JP-B-4-42,175 discloses an extruder which comprises an extruding unit having a die holder with a horizontal lead-through groove. A die plate is slidably arranged in the lead-through groove of the die holder, for forming a strip rubber member with a predetermined cross-section by extruding a rubbery material through the die plate in a direction perpendicular to the lead-through groove. A cylinder device is associated with the extruding unit, and has a piston rod with the tip end detachably connected to the die plate. In this instance, when it is necessary to form a strip rubber member with a different cross-section by using the same extruding unit, the current die plate has to be changed with a next die plate. To this end, the piston rod of the cylinder device is moved backward to pull the current die plate out of the lead-through groove, and the piston rod is then moved forward to set a next die plate and push it up to the extruding position of the lead-through groove.

Such an arrangement of the known extruder suffers from a problem that, when the current die plate is pulled out of the lead-through groove and removed from the piston rod and replaced by a next die plate, the operator has to perform manual operations for changing the die plates because the extruder is not equipped with a unit for these operations.

A similar extruder for rubbery materials is also disclosed in JP-A-57-210,839, which includes an extruding unit having an extruding head formed with a horizontal lead-through groove, a die holder slidably arranged in the lead-through groove of the extruding head, and two die plates which are removably arranged on the die holder, i.e., a current die plate and a next die plate. The die holder is moved by a cylinder device along the lead-through groove. A strip rubber member with a predetermined cross-section is formed by extruding a rubbery material through the current die plate in the direction perpendicular to the lead-through groove. In this instance, the die plates are changed by operating the cylinder device to move the die holder along the lead-through groove so that the current die plate is ejected at the lateral side of the die holder (the current die plate becomes the last die plate after it has been ejected), moving the next die plate until it reaches an extruding position (the next die plate becomes the current die plate after it has reached the extruding position), and thereafter replacing the last die plate ejected to the lateral side of the die holder with the next die plate.

This type of extruder also suffers from a problem that an operator has to perform manual operations for changing the die plates because the extruder is not equipped with a unit for changing die plates.

SUMMARY OF THE INVENTION

It is therefore an object of the present invention to provide a novel extruder for rubbery materials, which makes it possible to readily change the die plates at a high speed and with less labor.

According to the present invention, there is provided an extruder for rubbery materials, which comprises an extruding unit having a die holder in which a horizontally extending lead-through groove is formed, and a die plate slidably arranged in the lead-through groove of the die holder, for extruding a rubbery material through the die plate in a direction perpendicular to the lead-through groove and thereby forming a strip rubber member with a predetermined cross-section. A storing means is arranged on one side of the extruding unit, for temporarily storing a plurality of types of die plates to be subsequently used on a storing table in accordance with a predetermined use priority and delivering a next die plate from the storing table to a waiting position along an extension line of the lead-through groove. A moving means is provided, which is operative when the die plates are to be changed, for moving a current die plate together with the next die plate at the waiting position, along the lead-through groove in a direction toward the other side of the extruding unit, ejecting the current die plate from the lead-through groove and moving the next die plate to an extruding position in the lead-through groove.

With the above-mentioned arrangement of the extruder according to the present invention, it is assumed that the extruding unit is operated to extrude a rubbery material through a die plate (current die plate), and a strip rubber member with a predetermined cross-section is continuously formed. In this instance, the current die plate remains at the extruding position of the lead-through groove and various types of die plates to be used later are temporarily stored on the storing table in accordance with the use priority. To replace the current die plate with a next die plate to thereby form a strip rubber member with a different cross-section, the next die plate is delivered to the waiting position on the extension line of the lead-through groove at one side of the die holder by the storing means, and the operation of the extruding unit is stopped. Then, the current die plate and the waiting next die plate are moved together by the moving means to the other side of the extruding unit, along the lead-through groove, so as to eject the current die plate from the lead-through groove (at this point in time, the current die plate changes to the last die plate) and move the next die plate to the extruding position in the lead-through groove (at this point in time, the next die plate changes to the current die plate). Then, the extruding unit is operated again and a strip rubber member with a different cross-section is continuously formed by the current die plate.

As described above, the next die plate is delivered from the storing table to the waiting position by the storing means. Moreover, when the current die plate is moved to the other side of the extruding unit and removed from the lead-through groove, it separates from the die holder. Therefore, no manual operations are required for changing the die plates and it is thus possible to save the labor. Since, furthermore, a plurality of die plates can be fed to the storing means at the same time, the operation can be simplified. Moreover, the die plates are changed in order by successively moving the die plates from one side of the extruding unit to the other, so that the storing means can be arranged only on one side of the extruding unit, making it possible to achieve a downsizing of the extruder.

DESCRIPTION OF THE PREFERRED EMBODIMENT

One preferred embodiment of the present invention will be described below with reference to the accompanying drawings.

Figure 1:
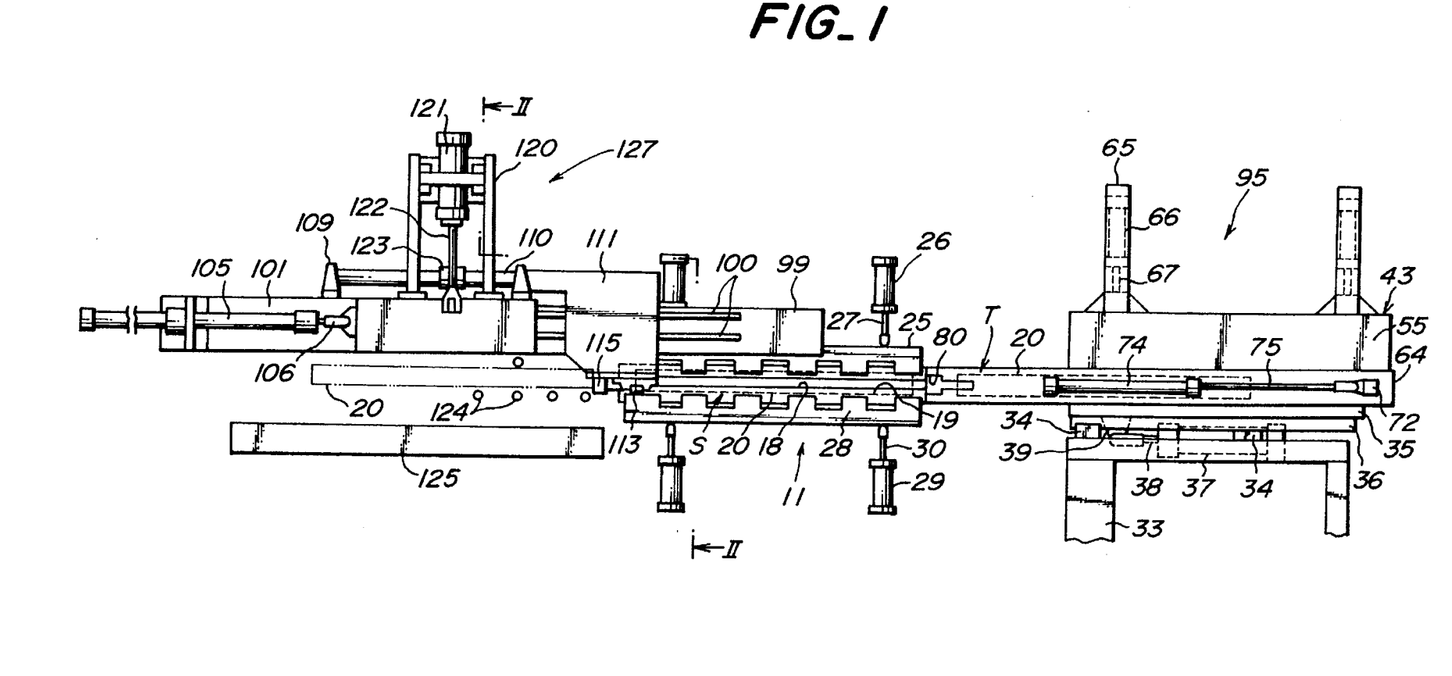
FIG. 1 is a schematic front view showing an extruder according to one embodiment of the present invention.
Figure 2:
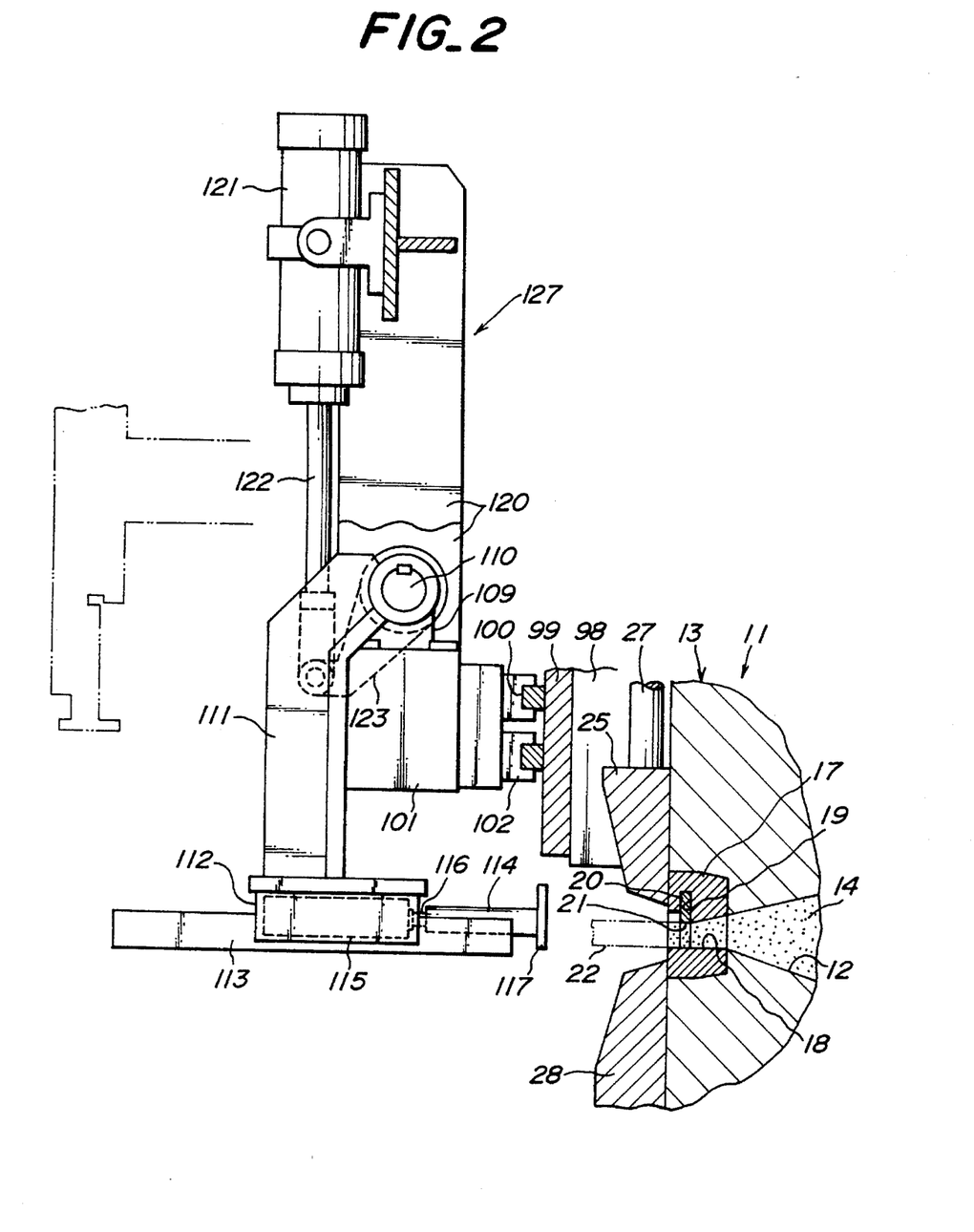
FIG. 2 is a sectional view taken along the line 2—2 in FIG. 1.

As shown in FIGS. 1 and 2, the extruder according to the present invention includes an extruding unit which is denoted by reference numeral 11. The extruding unit 11 has an extruding passage 12 which is formed in an extruding head 13. A rubbery material 14, such as unvulcanized rubber, is fed to the passage 12 by a feed screw not shown. A die holder 17 is arranged in the extruding head 13 to extend in a horizontal plane, and is formed with a passage 18 which is connected to the extruding passage 12. A lead-through groove 19 having a substantially rectangular cross-section is formed in the die holder 17, and extends horizontally in the longitudinal direction of the die holder 17. The lead-through groove 19 intersects with a middle point of the passage 18 substantially at right angles. A die plate 20 is slidably arranged in the lead-through groove 19 of the die holder 17, and has an aperture 21 with a predetermined cross-sectional shape. The rubbery material 14 fed to the extruding passage 12 is extruded in the direction perpendicular to the lead-through groove 19, through the passage 18 in the die holder 17 and the aperture 21 of the die plate 20, to form a strip rubber member 22 with a predetermined cross-section, such as a tread rubber. An upper clamp member 25 is supported at the upper front side of the extruding head 13 so that it can be moved vertically. The upper clamp member 25 is associated with a cylinder device 26 which is arranged above the upper clamp member 25. The cylinder device 26 includes a piston rod 27 having a tip end which is connected with the upper clamp member 25. A lower clamp member 28 is supported at the lower front side of the extruding head 13 so that it can be moved vertically. The lower clamp member 28 is associated with a cylinder device 29 which is arranged below the lower clamp member 28. The cylinder device 29 includes a piston rod 30 having a tip end which is connected with lower clamp member 28. The upper and lower clamp members 25 and 28 are urged against the upper and lower sides of the die holder 17 from the front, when the rubbery material 14 is extruded, to prevent dislocation of the die holder 17 out of the head 13 due to the pressure of the rubbery material 14. When the die plate 20 is to be exchanged, the piston rod 27 of the cylinder device 26 is moved backward to slightly raise the upper clamp member 25 and decrease the pressure applied by the upper clamp member 25 to the die plate 20, thereby allowing the movement of the die plate 20 in the lead-through groove 19.

Figure 3:
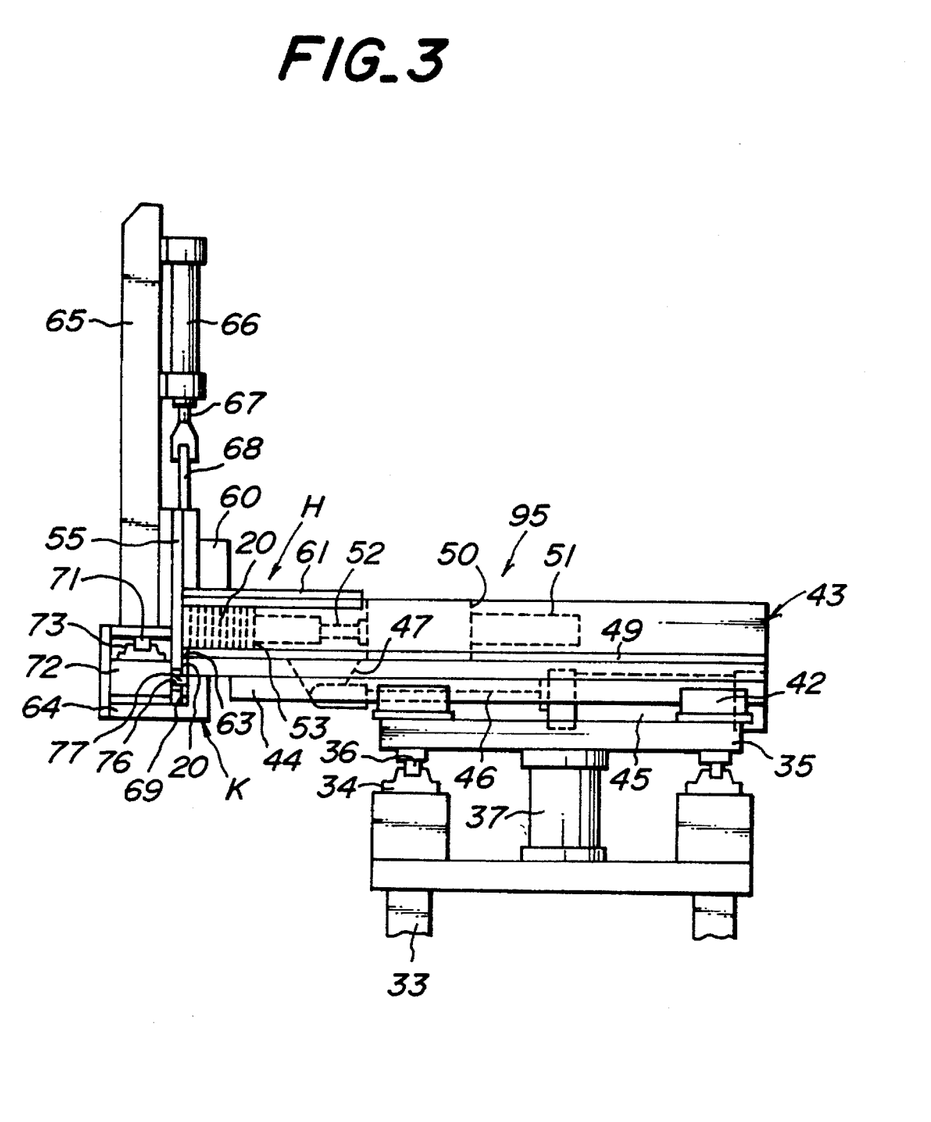
FIG. 3 is a right side view showing the storing means.
Figure 4:
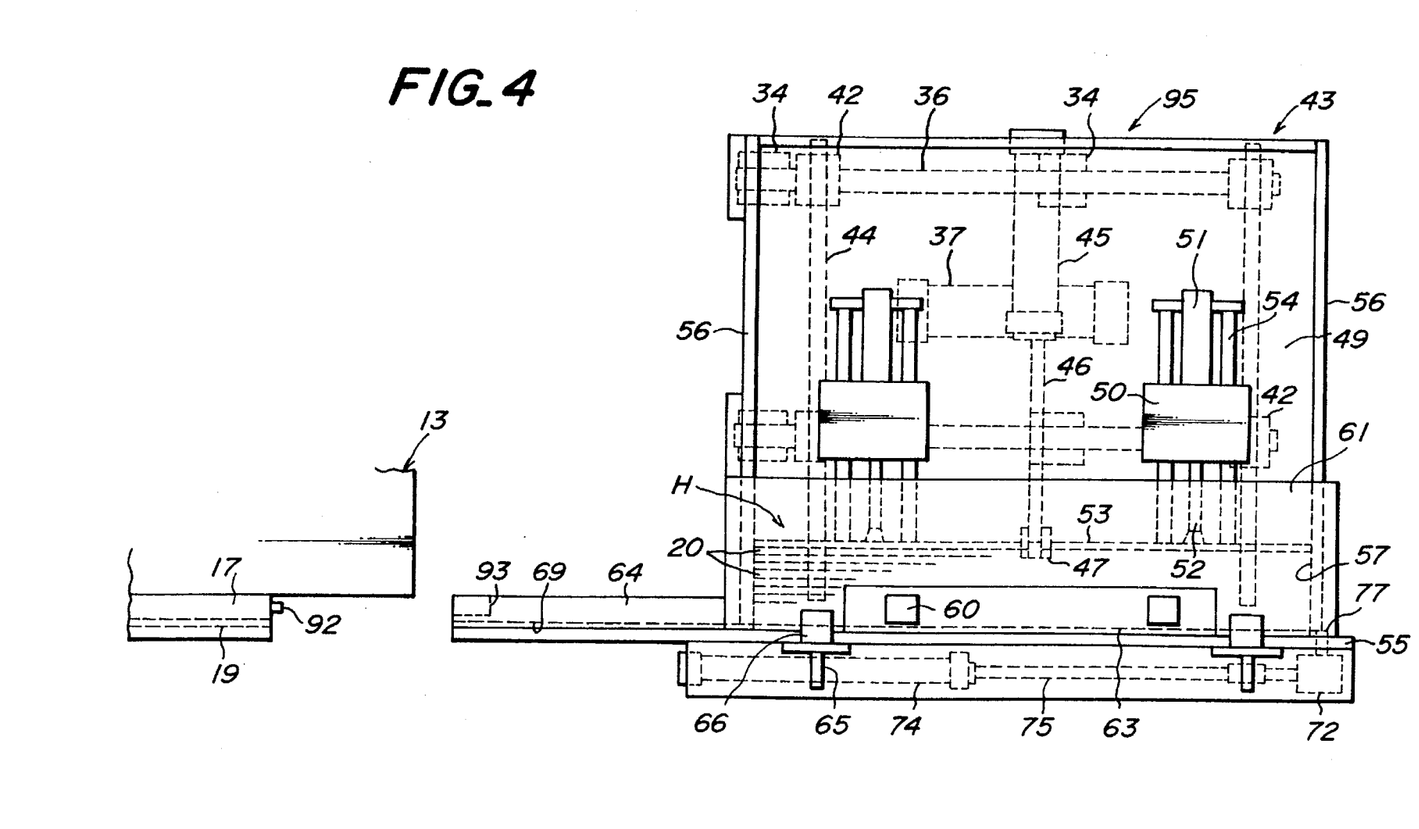
FIG. 4 is a fragmentary plan view of the extruder, showing the region in the vicinity of the storing means.
Figure 5:
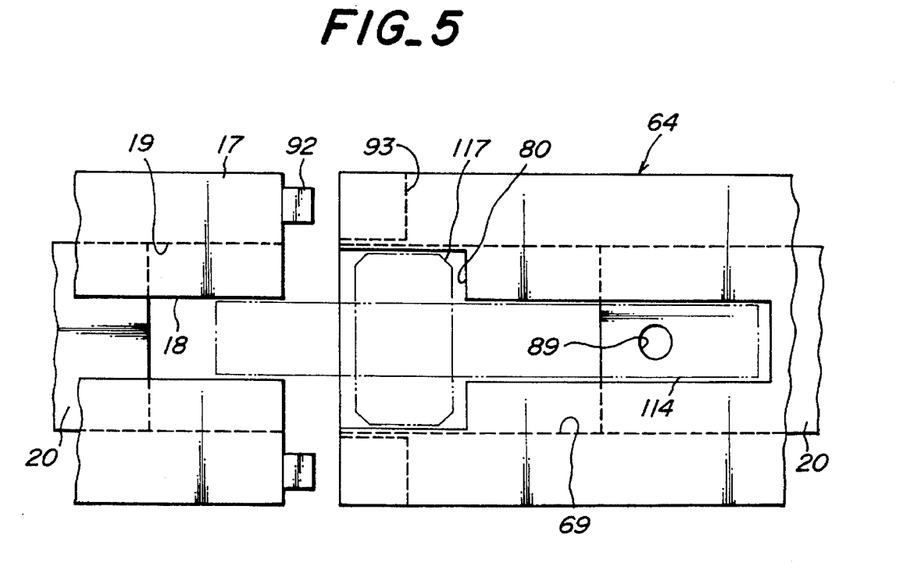
FIG. 5 is a fragmentary front view showing the die and guide holders.
Figure 6:
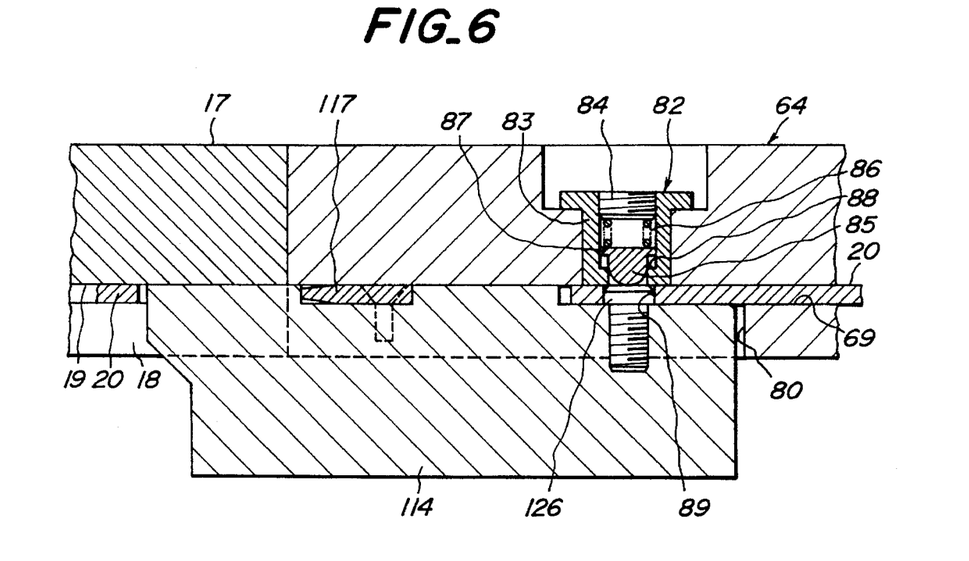
FIG. 6 is a sectional view taken in a horizontal plane and showing the moving pawl which has been inserted into a T-shaped aperture.

As shown in FIGS. 1, 3 and 4, a fixed frame 33 is arranged at one side (right side in FIG. 1) of the extruding unit 11. A plurality of slide bearings 34 are provided on the fixed frame 33. A horizontal movable table 35 is arranged above the fixed frame 33. A pair of horizontal guide rails 36 are arranged under the moving table 35. These guide rails 36 are slidably supported by the slide bearings 34. A cylinder device 37 is arranged on the fixed frame 33 between the guide rails 36 and in parallel therewith. The cylinder device 37 includes a piston rod 38 having a tip end which is connected to a bracket 39 secured to the lower surface of the movable table 35. Therefore, when the cylinder device 37 is operated and the piston rod 38 is moved forward or backward, the movable table 35 is caused to move in a horizontal plane while it is guided by the slide bearings 34 and the guide rails 36. A plurality of slide bearings 42 are arranged on the upper surface of the movable table 35. A substantially rectangular storing table 43 is arranged above the movable table 35. A pair of guide rails 44 are arranged on the lower surface of the storing table 43 and slidably supported by the slide bearings 42. A cylinder device 45 is provided for the movable table 35 between the guide rails 44. The cylinder device 45 includes a piston rod 46 having a tip end which is connected to the storing table 43 through a bracket 47. Therefore, when the cylinder device 45 is operated and the piston rod 46 is moved forward or backward, the storing table 43 is caused to move forward or backward. The storing table 43 has a horizontal mounting plate 49, and a pair of support blocks 50 are arranged on the mounting plate 49. Cylinder devices 51 are arranged on the support blocks 50, and include piston rods 52 having tip ends which are connected to a horizontally-extending pressure plate 53. A pair of guide rods 54 are slidably arranged in each support block 50, in parallel with the cylinders 51, and has tip ends which are also connected to the pressure plate 53. A space 57 is enclosed by the pressure plate 53, the mounting plate 49, and a front plate 55 and a side plate 56 of the storing table 43, and has an open top. The space 57 serves as a storing space in which various types of die plates 20 to be successively used are arranged with upright orientation and temporarily stored in accordance with the priority of use from the front to the rear sides. A pair of vertically-extending cylinder devices 60 are arranged on the back of the front plate 55, each including a piston rod having a tip end connected to a horizontal rectangular cover plate 61 which serves to close the top aperture of the storing space 57. The die plates 20 stored in the storing space 57 are urged against the front plate 55 by the pressure plate 53 and also urged against the mounting plate 49 by the cover plate 61, and are thereby maintained in the upright state. A slit 63 is formed at the front end of the mounting plate 49 contacted to the front plate 55, and has a width which is substantially equal to the thickness of the die plate 20.

As shown in FIGS. 1, 2, 4, 5 and 6, a horizontal guide holder 64 is arranged at the front end of the storing table 43, and has an upper surface which is provided with a pair of vertical posts 65. These posts 65 are associated with vertical cylinder devices 66, respectively, wherein each cylinder device 66 includes a piston rod 67 having a tip end which is connected to a vertical delivery plate 68 situated immediately above the slit 63. When the cylinder devices 66 are operated and the piston rods 67 are moved forward, the delivery plate 68 is lowered to push the die plate 20 downward, which is located at the front end into a guide groove 69 in the guide holder 64. The the die plate 20 is thereby pushed through the slit 63, and delivered from the storing position H in the storing space 57 to the lowering position K in the guide groove 69. A horizontal guide rail 71 is secured to the guide holder 64. A slider 72 is provided with a slide bearing 73 which is slidably engaged with the guide rail 71. A horizontal cylinder device 74 is provided for the guide holder 64, and includes a piston rod 75 having a tip end which is connected to the slider 72. The slider 72 is provided with a hook 77 extending up to the guide groove 69 through a horizontal slit 76 which is formed in the front plate 55. Therefore, when the cylinder device 74 is operated and the piston rod 75 is moved backward, the die plate 20 located at the lowering position K is engaged by the hook 77 of the slider 72 and moved toward the extruding unit 11, i.e., toward left in the guide groove 69. A substantially T-shaped aperture 80 is formed at the left end of the guide holder 64 and connected with the guide groove 69. A positioning stopper 82 having a substantially cylindrical body 83 is arranged at the left end of the guide holder 64. A spring holder 84 is screwed into the body 83 and a pin 85 is slidably arranged in the body 83 at a location in front of the spring holder 84. A spring 86 is arranged between the pin 85 and the spring holder 84. The spring 86 serves to urge the pin 85 forward until a flange 87 formed on the pin 85 contacts a terraced portion 88 of the body 83. When the die plate 20 is moved by the hook 77 toward the left end, as described above, the pin 85 is inserted into a through-hole 89 to position the die plate 20. When the die plate 20 moves to the left end in the guide groove 69 and the storing table 43 is simultaneously moved to the front end by the operation of the cylinder device 45 and the moving table 35 is moved to the left end by the operation of the cylinder device 37. On this occasion, the left end surface of the guide holder 64 contacts the right end face of the die holder 17, as shown in FIG. 1, so that the guide groove 69 and the lead-through groove 19 are on the same axis, and the die plate 20 at the left end in the guide groove 69 is brought into the waiting position T on the extension line of the lead-through groove 19. When the guide holder 64 contacts the die holder 17, a joint 92 at the right end of the die holder 17 is connected with a joint 93 at the left end of the guide holder 64, and hot water is fed into the die holder 17 from the guide holder 64 for heating the die holder 17 to a predetermined temperature. The aforementioned fixed frame 33, movable table 35, cylinder device 37, storing table 43, cylinder device 45, cylinder device 51, pressure plate 53, cylinder device 60, cover plate 61, guide holder 64, cylinder device 66, delivery plate 68, slider 72 and cylinder device 74 constitute storing means 95 which is arranged on one side of the extruding unit 11. The storage 95 serves to temporarily store various types of die plates 20 to be used later on the storing table 43 in accordance with the predetermined use priority, and delivering a next die plate 20 from the storing table 43 to the waiting position on the extension line of the lead-through groove 19.

As shown in FIGS. 1, 2, 5 and 6, a frame 98 is arranged at the other end of the extruding unit 11 (i.e., on the left end), and provided with a lateral support plate 99 which is arranged in front of the extruding unit 11. A pair of lateral guide rails 100 are arranged on the front side of the support plate 99 and serve to guide a movable frame 101. To this end, the movable frame 101 is provided with a plurality of slide bearings 102 which are slidably engaged with the guide rails 100. A cylinder device 105 is supported by the support plate 99 to extend in parallel with the guide rails 100, and includes a piston rod 106 having a tip end which is connected to the movable frame 101. Therefore, when the cylinder device 105 is operated, the movable frame 101 is guided by the guide rails 100 and moved laterally. A pair of bearings 109 are secured to the upper surface of the movable frame 101 and spaced laterally from each other. A rotary shaft 110 extending in parallel with the guide rails 100 is rotatably supported by the bearings 109. An arm 111 is secured to one end of the rotary shaft 110 and a slide bearing 112 is arranged at the tip end of the arm 111. A guide rail 113 is rotatably supported by the slide bearing 112 and a flat swing pawl 114 is secured to the tip end of the guide rail 113. A cylinder device 115 is arranged at the tip end of the arm 111 and extends in parallel with the guide rail 113. The cylinder device 115 includes a piston rod 116 having a tip end which is connected to the swing pawl 114. A flat guide pawl 117 is arranged at the tip end of the swing pawl 114 and has a thickness which is substantially equal to that of the die plate 20. The guide pawl 117 is arranged perpendicularly to the swing pawl 114. A pair of posts 120 are vertically arranged on the upper surface of the movable frame 101 and serve to support a vertical cylinder device 121. The cylinder device 121 includes a piston rod 122 having a tip end which is connected to a coupling arm 123 secured to the rotary shaft 110. Therefore, when the cylinder device 121 is operated and the piston rod 122 is moved forward and backward, the arm 111, guide rail 113, swing pawl 114 and guide pawl 117 undergo a joint swing motion about the rotary shaft 110, between the solid line position and the imaginary line position both shown in FIG. 2. The piston rod 122 of the cylinder device 121 protrudes and causes the arm 111 to swing into the solid line position in FIG. 1, and the piston rod 116 of the cylinder device 115 is moved forward and the guide pawl 117 is inserted into the guide groove 69 through the T-shaped aperture 80 as shown by imaginary line in FIG. 5. A pin 126 provided for the swing pawl 114 is thereby inserted into the through-hole 89 of the die plate 20 at the waiting position T, which is to be next used. In this instance, when the piston rod 106 of the cylinder 105 is moved backward, the swing pawl 114 moves to the other side of the extruding unit (i.e., leftward) with the other end of the rod 106 in contact with one end of the current die plate 20. Therefore, the current die plate 20 and the next die plate 20 are moved together in and along the lead-through groove 19. Then, the current die plate 20 is ejected from the aperture at the other end of the lead-through groove 19 (after the current die plate 20 has been ejected, it becomes the last die plate 20), guided by a guide roller 124 and dropped into a storing case 125 and stored therein. The next die plate 20 is moved through the lead-through groove 19 until it reaches the extruding position S. At this point in time, the die plate 20 becomes a current die plate 20. The aforementioned frame 98, support plate 99, movable frame 101, cylinder device 105, rotary shaft 110, arm 111, swing pawl 114, cylinder device 115, guide pawl 117, posts 120, cylinder device 121 and coupling arm 123 constitute moving means 127 for moving the current die plate 20 and the next die plate 20 to the other side together along the lead-through groove 19, ejecting the current die plate 20 from the lead-through groove 19, and moving the next die plate 20 to the extruding position S in the lead-through groove 19.

The operation and function of the above-mentioned embodiment will be described below.

It is assumed that the extruding unit 11 is operated so that the rubbery material 14 fed by the feed screw to the passage 12 is extruded through the passage 18 and the aperture 21 of the current die plate 20 which is situated at the extruding position S, to continuously form a strip rubber member 22 with a predetermined cross-section. In this instance, the storing table 43 is moved to the front left end position so that the left end of the guide holder 64 contacts the right end of the die holder 17 as shown in FIG. 1. As a result, the lead-through groove 19 and the guide groove 69 are connected with each other while maintaining a coaxial relation therebetween, and the joints 92 and 93 are thereby connected with each other to feed hot water into the die holder 17. The swing pawl 114 of the moving means 127 is then situated at the waiting position at the other end, which is shown by imaginary line in FIG. 2. Furthermore, a plurality of die plates 20 to be successively used are arranged and temporarily stored on the storing table 43 of the storage 95, i.e., in the storing space 57, in accordance with the priority of use from the front to the rear sides.

When the current die plate 20 is to be exchanged with a next die plate 20 to form the strip rubber member 22 with a different cross-section, the cylinder device 66 is operated and the piston rod 67 is moved forward. As a result, the delivery plate 68 is lowered while pushing downward the foremost die plate 20 in contact with the front plate 55, which is to be used next. Therefore, the next die plate 20 is supplied from the storing space 57 to the guide groove 69 in the guide holder 64 through the slit 63. Then, the piston rod 67 of the cylinder device 66 is moved backward and the delivery plate 68 is raised to the initial position. In this instance, a space is produced as the foremost die plate 20 is transferred to the guide groove 69. However, this space is filled when a plurality of die plates 20 on the storing table 43 are caused to slide toward the front plate 55 because the pressure plate 53 is continuously urged against the front plate 55 by the piston rod 52 of the cylinder device 51. Then, the cylinder device 74 is operated so that the piston rod 75 is moved backward and the slider 72 is moved leftward while being guided by the guide rail 71 and slide bearing 73. During such a leftward movement of the slider 72, the hook 77 of the slider 72 is engaged with the next die plate 20 which has been pushed in by the guide groove 69 and delivers the next die plate 20 leftward to the waiting position T in the guide groove 69. When, as described above, the next die plate 20 only is delivered to the waiting position T from the storing table 43, it is once lowered from the storing position H to the lowered position K. This is because, by doing so, the next die plate 20 can be more reliably supplied to the waiting position T as compared with the case wherein the die plate 20 is not lowered to the position K. When the next die plate 20 reaches the waiting position T, the pin 85 of the positioning stopper 82 is urged by the spring 86 and thereby inserted into the through-hole 89 of the next die plate 20 to achieve the positioning of the die plate 20. Then, the piston rod 75 of the cylinder 74 is moved forward and the slider 72 is returned to the initial position.

During the aforementioned operation of the storage 95, the moving means 127 performs the following operation. That is, the cylinder device 105 is operated and the piston rod 106 is moved forward, so that the movable frame 101 is moved rightward while being guided by the guide rail 100 and the slide bearing 102. The movable frame 101 stops as the swing pawl 114 reaches a position immediately before the T-shaped aperture 80. Then, the cylinder device 121 is operated and the piston rod 122 is moved forward, so that the arm 111 and swing pawl 114 are rotated by 90° about the rotary shaft 110 from the imaginary line position to the solid line position shown in FIG. 2. Subsequently, the cylinder device 115 is operated and the piston rod 116 is moved forward, so that the swing pawl 114 and guide pawl 117 are moved backward to approach the die holder 17 and guide holder 64 while being guided by the slide bearing 112 and guide rail 113. The forward movement of the piston rod 116 of the cylinder 115 stops when the guide pawl 117 is inserted into the guide groove 69 and the moving pawl 114 is inserted into the T-shaped aperture 80, passage 18 and lead-through groove 19. In this case, the left end of the swing pawl 114 is situated at a position very close to the right end of the current die plate 20 at the extruding position S. Moreover, the pin 126 of the swing pawl 114 pushes the pin 85 into the body 83 against the force of the spring 86 and is inserted into the through-hole 89 instead of the pin 85, to connect the swing pawl 114 and the next die plate 20 at the waiting position T.

Then, the operation of the extruding unit 11 is temporarily stopped and the cylinder device 26 is operated to move the piston rod 27 backward and slightly raise the top clamp member 25. As a result, the pressure applied to the current die plate 20 in the lead-through groove 19 from the top clamp member 25 is decreased, and the die plate 20 can be thus readily moved laterally along the lead-through groove 19. Then, the cylinder device 105 is operated to move the piston rod 106 backward and thereby move the movable frame 101 leftward (other side). As a result of such leftward movement of the movable frame 101, the swing pawl 114 moves the current die plate 20 leftward in the lead-through groove 19 and simultaneously moves the next die plate 20, which is engaged by the pin 126, through the guide groove 69 in the lead-through groove 19 at the same speed and in the same direction (leftward) as the current die plate 20. On this occasion, the die plates 20 are smoothly moved in the lead-through groove 19 and the guide groove 69, because they are guided by the guide pawl 117 which undergoes a sliding movement in the guide groove 69 and the lead-through groove 19 during the movement of the die plates 20. When the current die plate 20 is moved leftward in the lead-through groove 19 as described above, the rubbery material 14 is cut off by the current die plate 20. When the current die plate 20 is pushed out leftward from the die holder 17, the current die plate 20 becomes the last die plate 20 which is then dropped into the storing case 125 while being guided by the guide roller 124 and stored in the storing case 125. The next die plate 20 is moved in engagement with the pin 126 and stops when it reaches the extruding position S and now becomes the current die plate 20.

Then, the piston rod 27 of the cylinder device 26 is moved forward to lower the top clamp member 25, so that the die plate 20 at the extruding position S is urged against the die holder 17 to be locked thereby, and the feed screw of the extruding unit 11 is rotated to extrude the rubbery material 14 through the die plate 20 in the same manner as discussed above so as to form the strip rubber member 22 with a desired renewed cross-section. To change the die plates 20 again, the next die plate 20 is moved to the waiting position T and the swing pawl 114 is inserted into the T-shaped aperture 80 in the same manner as the above. The operation of the extruding unit 11 is then stopped to slightly move the top clamp member 25 upward. The current die plate 20 at the extruding position S is subsequently ejected from the lead-through groove 19 by the moving means 127 and the next die plate 20 at the waiting position T is moved up to the extruding position S. Thus, the storage 95 and the moving means 127 operate whenever the die plates 20 are to be changed. When the storing space 57 becomes empty after all the die plates 20 on the storing table 43 have been delivered, the piston rod 52 of the cylinder 51 device is moved backward to move the pressure plate 53 backward and form a large storing space 57 between the pressure plate 53 and the front plate 55. Then, a plurality of types of die plates 20 to be used in the next stage are arranged in accordance with the priority of use and stored in the storing space 57. Subsequently, the piston rod of the cylinder device 51 is moved forward to urge the die plates 20 against the front plate 55 by the pressure plate 53 and bring the die plates into alignment with each other. When the priorities of the die plates 20 thus arranged in the storing space 57 of the storing table 43 are changed later, the cylinder device 60 is operated to raise the cover plate 61 for allowing the priorities to be changed, and to subsequently lower the cover plate 61 so that the die plates 20 are urged against the mounting plate 49. Thus, the next die plate 20 is delivered from the storing table 43 to the waiting position T by the storing means 95. When the current die plate 20 is moved to the other side of the extruding unit 11 and goes out of the lead-through groove 19, it is removed from the die holder 17. Therefore, no manual operations are necessary for changing the die plates and it is thus possible to save labor. Since a plurality of die plates 20 can be supplied to the storing means 95 at the same time, it is possible to simplify the operations. Furthermore, because die plates 20 are replaced in order by successively moving them from one side (right) to the other (left), it is sufficient to arrange the storage 95 only on one side (right side) of the extruding unit 11, making it readily possible to achieve a downsizing of the extruder.

To change die holders 17 in the extruder, it is necessary to move the storing table 43 and swing pawl 114 backward as otherwise a die holder change unit (not shown), the storage 95 and the moving means 127 may interfere with each other. To this end, the cylinder device 37 is operated to move the piston rod 38 backward and move the storing table 43 to the right end. Then, the cylinder device 45 is operated to move the piston rod 46 backward and move the storing table 43 up to the rear end. For the moving means 127, however, it is necessary to move the piston rod 122 of the cylinder device 121 backward and move the swing pawl 114 backward up to the imaginary line position shown in FIG. 2. The die holders 17 can now be changed under the above state. Thereafter, for changing the die plates 20 again, the piston rod 46 of the cylinder device 45 is moved forward to move the storing table 43 up to the front end. In this case, the die holder 17 and the guide holder 64 are on the same axis. However, the guide holder 64 is located separately from one side (right side) of the die holder 17 by a certain distance. Then, the cylinder device 37 is operated to move the piston rod 38 forward and move the storing table 43 leftward from the extruding unit 11. The leftward movement of the storing table 43 stops when the left end of the guide holder 64 contacts the right end of the die holder 17 as shown in FIG. 1.

As fully described hereinabove, the present invention makes it possible to readily change the die plates without requiring manual operations, and to thereby save labor.

While the present invention has been described with reference to a specific embodiment, it has been given by way of examples only. It is of course that various changes and modifications may be made without departing from the scope of the invention as defined by the appended claims.

For example, it is possible to extrude the rubbery material 14 through the die plate 20 downward (vertically), instead of forward (horizontally) as in the illustrated embodiment.

I claim:

1. An extruder for rubbery materials, comprising:

an extruding unit having a die holder in which a horizontally extending lead-through groove is formed, and a die plate slidably arranged in the lead-through groove of the die holder, for extruding a rubbery material through the die plate in a direction perpendicular to the lead-through groove and thereby forming a rubber strip having a given cross-section;

storing means, arranged on one side of the extruding unit, for temporarily storing a plurality of die plates to be subsequently used in accordance with a known priority of use and delivering a next die plate to a waiting position along an extension line of the lead-through groove; and moving means arranged on another side of the extruding unit, said moving means including a movable frame and a movable pawl mounted on said movable frame, said moving means being operative when the die plates are to be changed, for engaging said movable pawl with a current die plate and a next die plate at the waiting position, and subsequently causing said movable pawl to move along the lead-through groove from one side to another, thereby moving said current die plate together with the next die plate at the waiting position, along the lead-through groove in a direction toward the other side of the extruding unit, ejecting the current die plate from the lead-through groove and moving the next die plate to an extruding position in the lead-through groove.

2. An extruder according to claim 1, wherein said storing means comprises a storage table, said die plates stored sequentially on said storage table, urging means to bias said die plates into contact with each other, and toward a guide groove and a piston device having a delivery plate to urge said next die plate from said storage table to said waiting position.

3. An extruder according to claim 1 further comprising a guide rail having a slide bearing, said movable frame mounted on said guide rail.

4. An extruder according to claim 1 further comprising an extensive cylinder-piston assembly carried by said moving means and operably coupled to said movable pawl to rotate said movable pawl.

* * * * *